April 26, 1960  R. D. TRACEY  2,934,230

DETACHABLE LOW BED TRAILER

Filed June 9, 1958  3 Sheets-Sheet 1

INVENTOR.
RICHARD D. TRACEY

BY
ATTORNEY.

April 26, 1960 R. D. TRACEY 2,934,230
DETACHABLE LOW BED TRAILER
Filed June 9, 1958 3 Sheets-Sheet 2

INVENTOR.
RICHARD D. TRACEY
BY
ATTORNEY.

April 26, 1960 R. D. TRACEY 2,934,230
DETACHABLE LOW BED TRAILER
Filed June 9, 1958 3 Sheets-Sheet 3
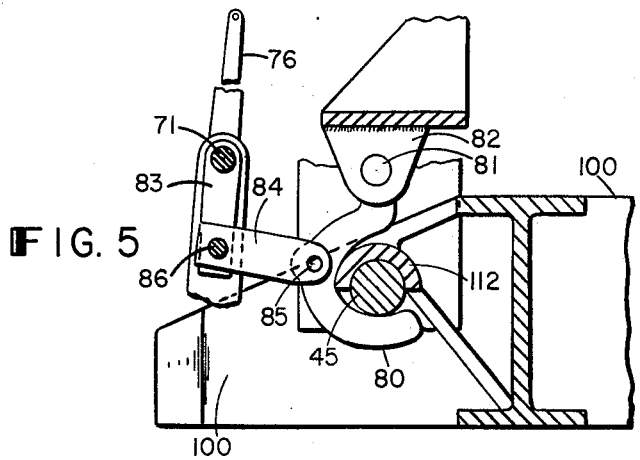
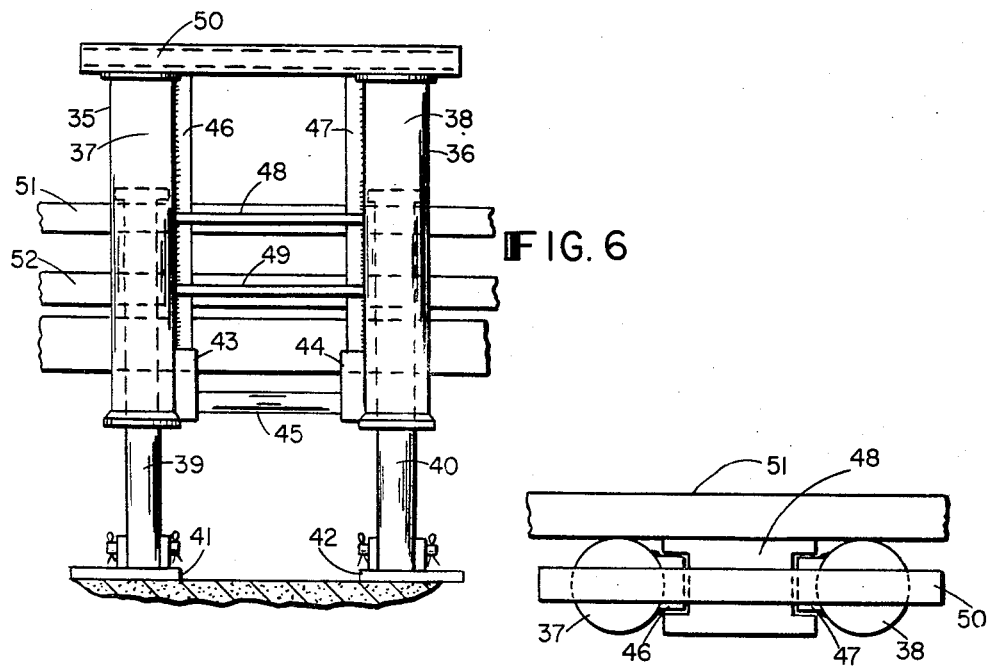
INVENTOR.
RICHARD D. TRACEY
BY
ATTORNEY.

United States Patent Office
2,934,230
Patented Apr. 26, 1960

2,934,230

DETACHABLE LOW BED TRAILER

Richard D. Tracey, Lexington, Mass.

Application June 9, 1958, Serial No. 740,874

7 Claims. (Cl. 214—506)

This invention relates to highway trailers and more particularly to those of the detachable low bed type.

Trailers are now generally used to transport heavy equipment such as tractors, power shovels, derricks and the like from one operating location to another. The most convenient method for loading and unloading such equipment it to use a low bed trailer having a rear wheel assembly and a front end adapted to be both attachable to a highway tractor and lowerable to the ground so as to permit loading and unloading from the front end without the need of loading docks, ramps or other special facilities.

However, previously described systems for moving such a front end in and out of position with a tractor for loading and unloading have not been completely satisfactory. For example, power-driven cables on the tractor can be arranged to raise and lower loaded trailers but involve elaborate, expensive, space-consuming equipment requiring an operator of great skill. Separate hydraulic jacks have also been described for raising and lowering a loaded trailer but the use of such are time-consuming and unsafe. Detachable gooseneck type trailers have been described where the gooseneck portion is vertically movable on the fifth wheel of the tractor and is actuated by either a cable assembly on the tractor or by mounted hydraulic jacks. The motion of the gooseneck serves to raise and lower the trailer bed by means of engaging members. These latter types also require skill for safe manipulation.

One object of this invention is to provide a detachable trailer whose bed can be easily and safely lowered and raised into position for loading and unloading. A further object of this invention is to provide such a trainer which can be securely locked in its desired position by a simple one-lever action.

Further objects and a fuller understanding of my invention will hereinafter appear from the following description and claims.

The invention comprises broadly a low bed trailer having a body with a rear end axle and wheel assembly and beams extending beyond the front end, a detachable connecting frame housing an elevator assembly powered by two-way power hydraulic jacks mounted on its depending face and adapted to slide up and down on said face and a tractor having a conventionel fifth wheel assembly by which the frame is removably attached to the tractor. The elevator and the trailer are provided with complementary attachment means for raising and lowering the trailer. The frame and trailer are provided with complementary means for aligning the frame, elevator and trailer. The frame is provided with means for locking the elevator to the trailer and for supporting said trailer.

In operating position, the frame is mounted on the fifth wheel of the tractor and maintained in substantially stationary position on the tractor by separate supporting members mounted on the tractor. To raise the trailer the elevator assembly is lowered to the ground, engaged with the trailer, and actuated so as to lift the trailer to aligned travelling level. Then, by one simple operation of a lever, the frame locks and supports both the trailer and the elevator, allowing the elevator actuating members to be withdrawn.

A preferred embodiment is described below and shown in the accompanying drawing in which:

Fig. 5 shows the means for connecting and locking the frame to the trailer.

Fig. 6 is a schematic of a top view showing the elevator means by which the jack casings slide up and down on the stationary frame when trailer is being raised or lowered.

Fig. 7 is a schematic of an end view of Fig. 6 taken in the direction of Fig. 2.

Figure 1:
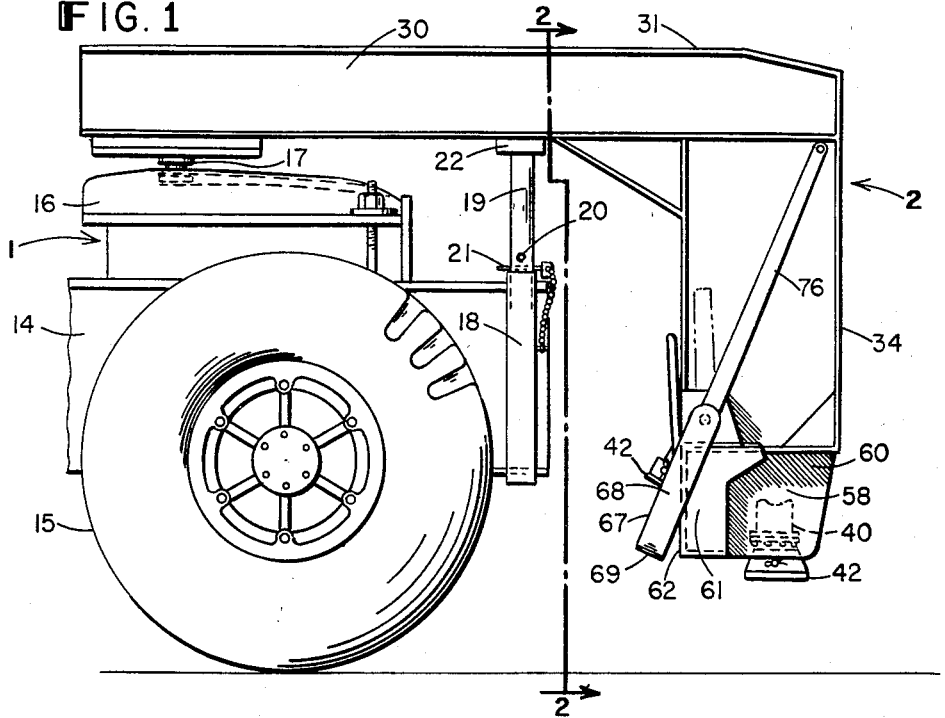
Fig. 1 is a side view of a portion of the rear end of the tractor with the frame attached.
Figure 2:
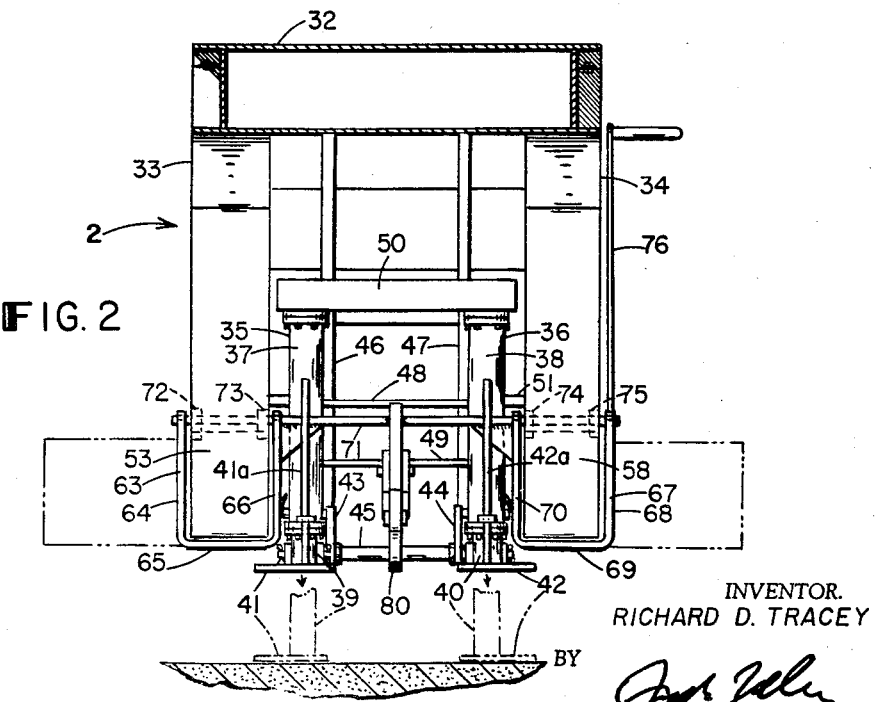
Fig. 2 shows a section taken on line 2—2 of Fig. 1.

Referring to the drawings, the tractor 1 is provided with main beams 14 and conventional rear wheels 15 with the usual fifth wheel assembly 16 carrying the conventional king pin elements 17 for connection to the connecting frame 2. Attached to the main beams 14 are vertically adjustable frame support tubes 18 with interior tubes 19 provided with matching holes 20 into which fixing pins 21 are inserted when caps 22 are in contact with the horizontal neck of the frame.

The frame 2 has a horizantal neck 30 having outside longitudinal beams 31 and cross beams 32 connecting the longitudinal beams together. Attached to the horizontal neck 30 is a depending section comprising outside vertical arms 33 and 34 connected together by suitable cross beams.

Slidably associated with the depending section of the frame is a trailer elevator assembly. This assembly comprises two-way power hydraulic vertical jacks 35 and 36 having casings 37 and 38 with rams 39 and 40 having pivoted feet 41 and 42 with positioning rods 41a and 42a. The jacks are operated by hydraulic pressure supplied to the casings of the jacks through the usual flexible hoses from the tractor or other suitable source and is supplied under the control of the usual supply and reversing valves so that the rams of the two jacks can be moved in tandem upwardly and downwardly to extended and retracted positions selectively, or, with the feet of the rams resting on the ground, the casings can be moved in tandem upwardly and downwardly to extended and retracted positions selectively. Along the lower portion of the side of casing 37 is a lift plate 43 and extending to the top of the casing is a vertical slide 46. Along the lower portion of the side of casing 38 is a lift plate 44 and extending to the top of the casing is a vertical slide 47. Said slides are spaced from and facing each other in the same plane. Across the tops of casings 37 and 38 and rigidly connecting them together in tandem is a horizontal header 50. Connecting lift plates 43 and 44 together is a horizontal tandem lift bar 45. The combination of the horizontal header 50 and the horizontal lift bar 45 holds the jacks and their associated vertical slides in a vertical position parallel to each other for ready reciprocation as a unit assembly. Attached between the outside vertical arms 33 and 34 are horizontal supporting beams 51 and 52 on which are mounted horizontal slide guides 48 and 49. On both ends of each of these slide guides are U-shaped vertical slots adapted to receive slides 46 and 47 and allow free vertical motion of the elevator assembly while the complementary depending section of the frame remains stationary.

At the lower end of vertical arm 33 is an aligning receiving chamber 53 having a bevelled top, side walls 55 and 56, a back 57 and an open front and bottom. At the lower end of vertical arm 34 is an aligning receiving chamber 58 having a bevelled top, side walls 60 and 61, a back 62 and an open front and bottom. Extending horizontally through the lower portions of arms 33 and 34 and above the receiving chambers 53 and 58 is a shaft 71 with the bearings 72 and 73 in arm 33 and bearings 74 and 75 in arm 34.

Permanently attached to shaft 71 and depending from it are yokes 63 and 67. The yoke 63 is positioned so that when moved to a vertical position, the sides 64 and 66 will clear the outside surfaces of the side walls of the receiving chamber 53 and the bottom 65 will extend horizontally across the open bottom of the chamber 53. Likewise, when yoke 67 is simultaneously moved to a vertical position, the sides 68 and 70 will clear the outside surfaces of the side wall of the receiving chamber 58 and the bottom 69 will extend horizontally across the open bottom of the chamber 58.

Depending from a cross beam in the frame is an ear 82 to which is pivoted at 81 a locking oscillating claw 80, connected by double links 84 and 83, pivoted at 85 and 86, to shaft 71 to which one end of link 83 is permanently attached. On one end of shaft 71 there is also permanently attached a lever 76.

The trailer 3 has longitudinal main body beams 100 and 101 conventionally attached to rear axle assembly 102 having a rear end wheel assembly 103 and 104. Body beams 100 and 101 extend and project forwardly beyond the transverse skid rail 122 forming alignment elements 110 and 111. Beam 100 is fabricated with its top surface 118 tapering downwardly and its side surfaces 120 tapering inwardly. Likewise, beam 101 is fabricated with its top surface 119 tapering downwardly and its side surfaces 121 tapering inwardly. Positioned between alignment elements 110 and 111 and mounted on angle supports 113, 114 and 115 and 116 attached to a cross beam is a horizontal transverse raising channel 112 having a concave downwardly facing cross section. Extending across the top of channel 112 and connected to the end cross beam is a guide plate 117 positioned in the same plane as the surfaces 118 and 119.

Figure 3:
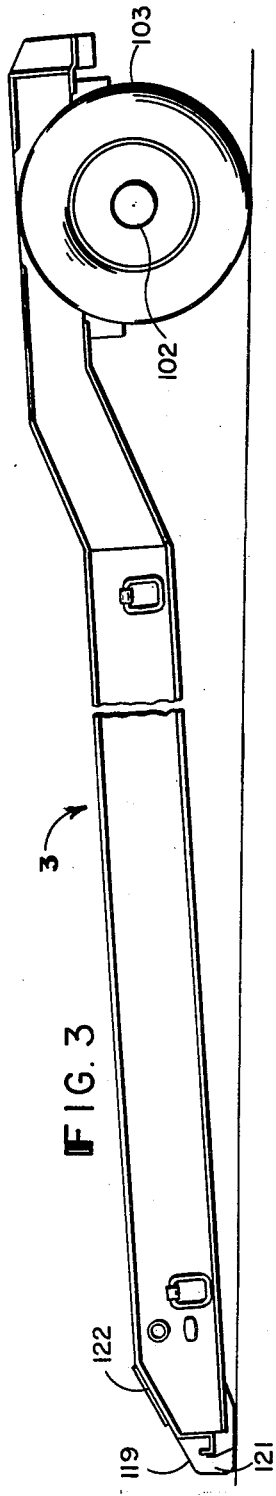
Fig. 3 is a side view of the trailer.
Figure 4:
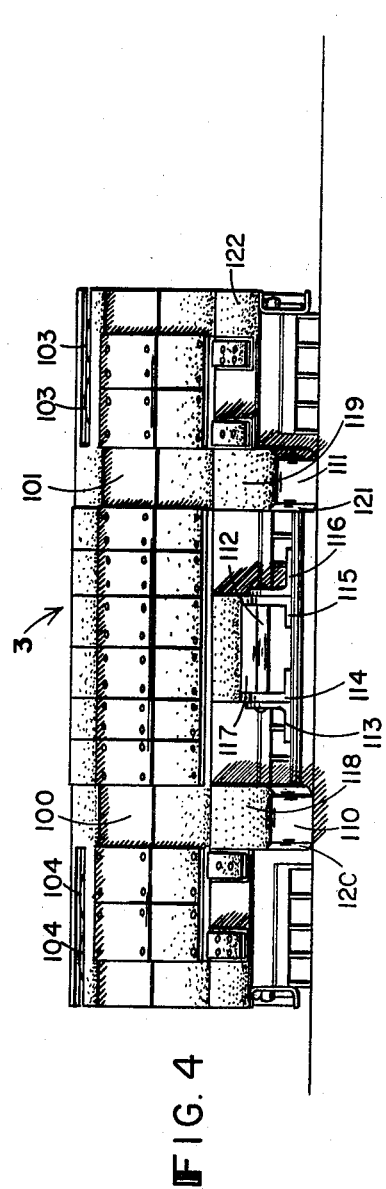
Fig. 4 is an end view of the trailer.

In operation, with the trailer loaded, and the front end on the ground, as shown in Figs. 3 and 4, the tractor is backed up to the trailer. The interior tubes 19 of frame support tubes 18 are raised until caps 22 are in contact with the lower surfaces of beams 31. The locking pin 21 is then inserted in one of holes 20. This prevents the downward tilting of the frame around the king pin and holds the neck 30 substantially horizontal. The lever 76 is moved clockwise, simultaneously moving yokes 63 and 67 and also locking claw 80, attached to lever 76, in a clockwise direction. The open bottoms of receiving chambers 53 and 58 are thus cleared of possible obstruction due to the bottoms 65 and 69 of yokes 63 and 67. The locking claw 80 is thus also moved to one side around pivot 81 so as not to obstruct the later positioning of bar 45 with respect to channel 112. The elevator assembly is hydraulically lowered until cross bar rests on top of guide 48 which prevents further downward movement. The rams are then lowered until the feet 41 and 42 and the lift bar 45 just clear the ground. The tractor is then maneuvered backwards until the alignment elements 110 and 111 enter the open fronts of the receiving chambers 53 and 58 while the cylindrical bar 45 is positioned below the concave downwardly facing raising channel 112. The rams are then lowered until they are firmly positioned on the ground.

The elevator assembly is then hydraulically raised, the rams remaining stationary with their feet on the ground while the tandem casings, with lift bar 45 attached, moved upward. During this operation, the frame remains horizontal, the bar 45 engages the channel 112 as the elevator rises and as the elevator continues to rise, the trailer is lifted clear of the ground and to a horizontal position, the guides 46 and 47 of the elevator assembly sliding in the stationary guide slides 48 and 49 attached to the frame. When in transporting position, the lever 76 is then thrown counterclockwise which positions the bottoms of the yokes underneath the receiving chambers in which the elements 110 and 111 are now positioned. Simultaneously, by the action of lever 76, the claw 80 is moved under bar 45, locking it in position with respect the channel 112. The pin 21 is then removed, allowing caps 22 to be lowered. The casings 37 and 38 are now locked in raised position by the claw 80. The rams with attached feet are now fully retracted and trailer is ready for transportation.

In unloading, a reverse procedure is employed. The positioning tubes are moved up under the gooseneck and pinned in place. With locking claw and yokes in carrying position, the rams are lowered to the ground. The handle is moved clockwise which moves claw and yokes out of the way and unlocks the elevator. The casings with elevator attached are lowered onto the rams, now on the ground, which lowers the elevator coupled to the front end of the trailer until the front end of the trailer rests on the ground. The casings are further lowered until the cross bar 50 rests on top of the guide 48. This movement lowers lift bar 45 until it is below the channel 112 and disengaged from it. With casings and bar 50 held from further lowering by the guide 48, the rams are retracted to clear the ground and the tractor, with gooseneck attached is moved away. If desired, rams may then be lowered to the ground, casings raised until locking claw can be positioned and then rams retracted into casings.

While the preferred embodiment of my invention has been described in detail, it will be understood that I do not wish to be limited to the particular construction set forth, since various changes in the form, material, proportions, and arrangements of parts, and in the details of construction may be resorted to without departing from the spirit and scope of the invention, or destroying any of the advantages contained in the same, heretofore described and defined in the following claims.

I claim:

1. The combination of a tractor with a fifth wheel assembly, a trailer having a body with a rear end wheel assembly and with alignment and contact elements on the front end, a connecting frame having a horizontal neck and depending vertical arms fastened together by cross beams and connected by said fifth wheel assembly to the rear end of said tractor, a trailer elevator comprising two-way power jacks with casings connected in tandem slidably attached to the cross beams connecting the vertical arms of said frame, means connected to said tractor for supporting and holding said horizontal neck in a substantially horizontal position during elevator operation, complementary means attached to said slidable elevator for engaging said contact elements on said trailer, hook means for locking said complementary means to said contact elements and oscillating yoke means for supporting said front end of said trailer.

2. The combination of claim 1 wherein said elevator comprises a rigid vertically movable assembly adapted to be positioned between the outside vertical arms of said frame, having two similar vertical two-way power hydraulic jacks, each of said jacks having a casing with a vertical slide integrally connected thereto, said slides being spaced from and facing each other in the same plane, each of said casings being provided with a depending ram having a pivoted foot on its lower end, said vertical casings being integrally connected in tandem across their tops by a horizontal header and across their bottoms by a horizontal lift bar.

3. The combination of claim 1 wherein the outside vertical arms of said frame are integrally connected together by horizontal supporting beams, having integrally connected thereto horizontally disposed guides, each of said guides having on both ends U-shaped vertical slots adapted to receive and allow free vertical motion to said elevator slides.

4. The combination of claim 1 wherein the lower end of each of the outside vertical arms of the frame terminates in an aligning chamber having an open front and an open bottom, said elevator being positioned for vertical reciprocation between the outside depending arms of said stationary frame.

5. The combination of claim 1 wherein the lower ends of said depending arms are provided with an oscillating locking claw and yoke assembly comprising a horizontal transverse shaft extending between said arms and journalled therein, depending U-shaped yokes, the open ends of which are permanently attached to said shaft and shaped to enclose the sides and bottoms of said aligning chambers, a locking oscillating claw pivoted to a cross beam and linked to said shaft and shaped to be positioned under said lifting bar on said elevator when in a raised position, and a lever permanently attached to the end of said shaft, the movement of said lever giving movement simultaneously to said claw and said yokes.

6. The combination of claim 1 wherein said trailer has at least two longitudinal main beams and two side beams rigidly connected together by cross beams with one of said beams across the front end, said main beams projecting beyond said end beam, the top surface of each of said projections tapering downwardly, the side surfaces of each of said projections tapering inwardly.

7. The combination of claim 6 wherein said contact element on said trailer comprises a horizontal concave downwardly facing transverse raising channel positioned between said projections and extending beyond said end beam and parallel to it.

References Cited in the file of this patent

UNITED STATES PATENTS

| | | |
|---|---|---|
| 2,590,210 | Rogers | Mar. 25, 1952 |
| 2,822,945 | Duffy | Feb. 11, 1958 |
| 2,844,265 | Clark | July 22, 1958 |
| 2,854,162 | Keir | Sept. 30, 1958 |